Sept. 29, 1959 W. J. COULTAS 2,906,079
HITCH AND DRIVE MEANS FOR TRACTOR-IMPLEMENT TRAIN
Filed Nov. 19, 1956 2 Sheets-Sheet 1
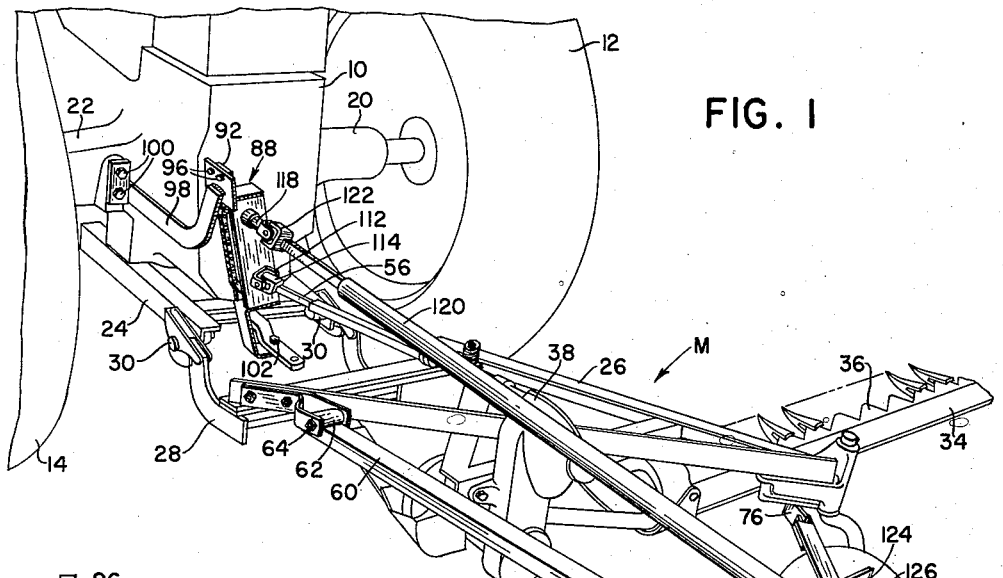
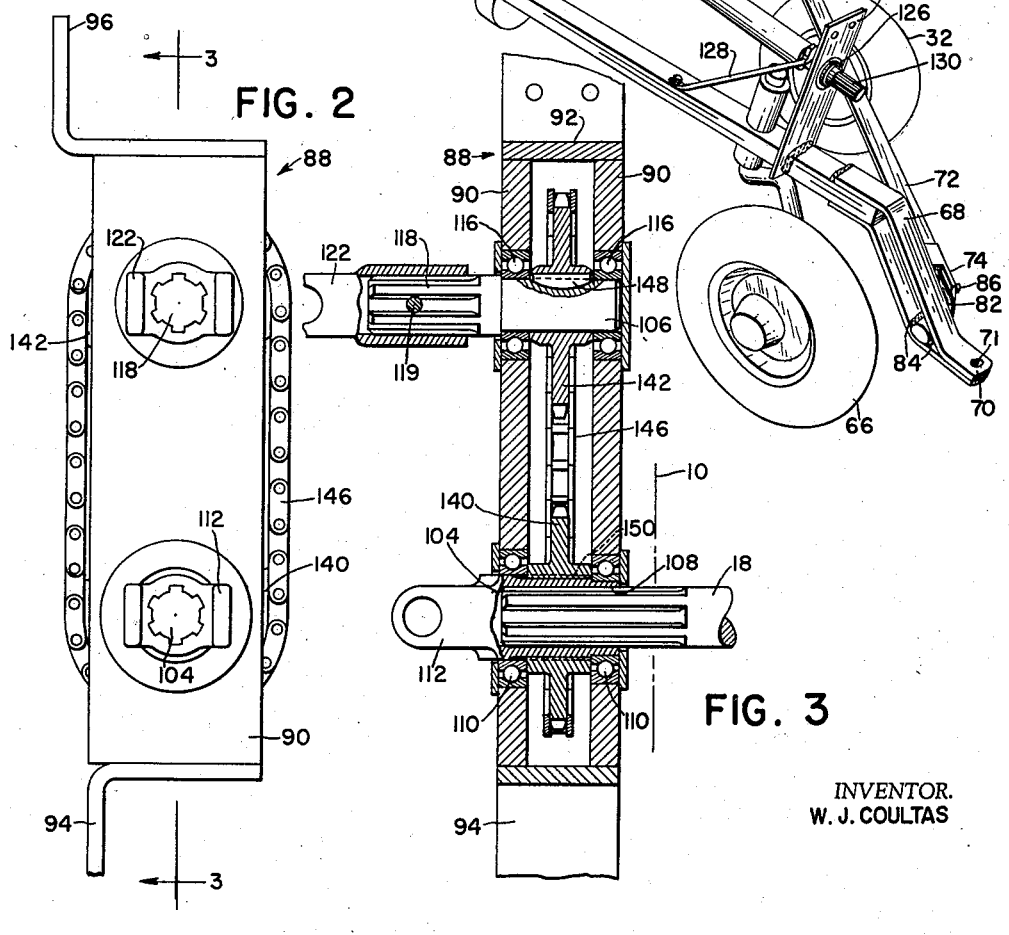
INVENTOR.
W. J. COULTAS

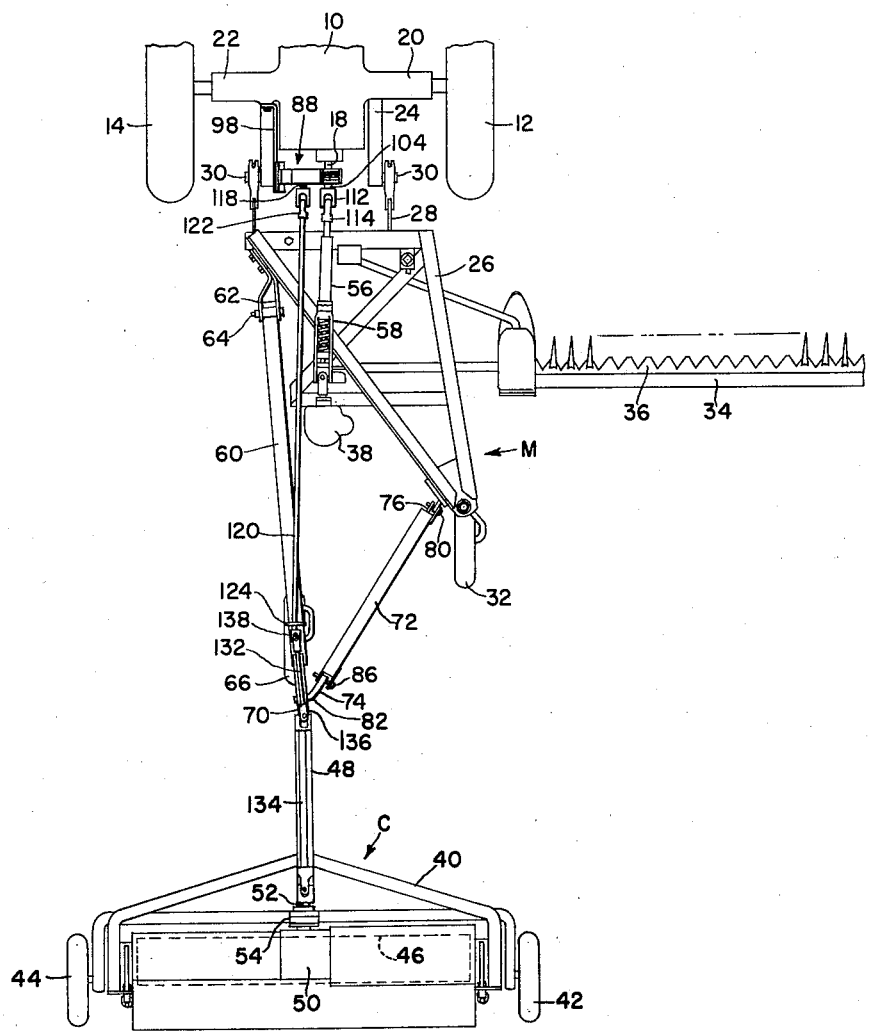

United States Patent Office 2,906,079
Patented Sept. 29, 1959

2,906,079

HITCH AND DRIVE MEANS FOR TRACTOR-IMPLEMENT TRAIN

Wilbur J. Coultas, Moline, Ill., assignor, by mesne assignments, to Deere & Company, a corporation of Delaware Application November 19, 1956, Serial No. 623,214

3 Claims. (Cl. 56—25)

This invention relates to improved hitch and drive coupling means for a vehicular train comprising a tractor and a plurality of implements.

The invention finds particular utility in the connection of a mower and a crop conditioner to a tractor in series relationship. A conventional mower of the trail-behind type comprises a fore-and-aft frame connected at its front end to the rear part of the tractor and supported at its rear end on one or more caster wheels, the cutting mechanism extending laterally to the right to cut a swath alongside the path traveled by the tractor. In some types of crop conditioners, sometimes referred to as hay crushers, the crushing mechanism is operated directly behind the cutter bar and treats the swath immediately cut. In other arrangements, the conditioner may be drawn separately, and in a preferred arrangement the conditioner is drawn directly behind the tractor so as to treat the swath previously cut by the mower. The hitch provided according to the present invention is primarily useful in the situation just described.

The invention has for a principal object the provision of an improved hitch frame and drive means whereby the tractor power take-off may be used to drive the cutting mechanism and the crop treating mechanism via independent power shafts. This facilitates the design and use of the power mechanism and further enables the use of independent slip clutches for the two implement mechanisms. It is a further object of the invention to afford an improved drive coupling means for use with a plurality of implements or with a single implement having a plurality of drivable parts. The invention features a novel coupling having a support including the pair of shafts referred to, one of which has an axially hollow splined portion affording a quick-removable coaxial coupling with the tractor power take-off, this shaft including at its opposite end means for connection to one implement and the other shaft having at least one projecting end connectible to another implement. It is an object of the invention to provide means for mounting the support on a tractor for use with associated implement driving mechanisms.

The foregoing and other important objects and desirable features inherent in and encompassed by the invention will become apparent as a preferred embodiment of the invention is disclosed by way of example in the ensuing specification and accompanying sheets of drawings, the several figures of which are described immediately below.

Fig. 1 is a fragmentary perspective of the rear portion of a tractor and mower and the associated hitch.

Fig. 2 is a rear view, on an enlarged scale, of the drive coupling unit.

Fig. 3 is a section on the line 3—3 of Fig. 2.

Fig. 4 is a plan, on a reduced scale, showing the vehicular train made up of the tractor, mower and crop conditioner.

The tractor illustrated is of a well-known commercial type comprising a main body 10 carried on right and left hand rear traction wheels 12 and 14 and conventionally equipped with a rearwardly extending power take-off 18 (Fig. 3). The body 10 of the tractor includes right and left hand axle housings 20 and 22 for journaling axles on which the wheels 12 and 14 are mounted.

Draft structure 24, forming a part of or otherwise rigidly secured to the tractor body 10, affords means for the connection to the tractor in trailing relation of a mower M, which may be of any conventional construction. The mower illustrated has a mower frame 26 provided with a hitch connection 28 including coaxial pivots at 30 for enabling articulation of the mower relative to the tractor about a transverse horizontal axis. The mower frame is supported at its rear end on a caster wheel 32 and cutting means in the form of a conventional cutter bar 34 extends laterally from the right hand side of the mower frame so as to cut a swath offset laterally to the right of the path traveled by the tractor. Here, as in the claims, the expressions "right" and "left," as well as "front" and "rear" are used relatively and as terms of convenience and not of limitation, since it is obvious that the parts could be arranged at the opposite side of the longitudinal center line of the tractor. It is conventional practice, however, to mow at the right side of the tractor.

The cutter bar 34 carries a reciprocating sickle 36 driven by drive mechanism contained in a drive mechanism housing 38, the details of which are not material here and therefore are not specifically illustrated.

The crop conditioner, denoted in its entirety by the letter C, is of the type disclosed in the U.S. patent to Cunningham 2,711,622; although, this implement could be of any other design. As shown, the conditioner C is disposed in trailing relationship to the tractor and is rearwardly of the mower M in laterally offset relationship to the left of the mower so as to operate on a swath previously cut by the cutting means 34—36. One of the reasons for the offsetting is that a swath has an opportunity to lie undisturbed until the next turn of the train about the field. In short, the swath is not immediately cut and then treated by the conditioner.

The conditioner comprises a frame 40 carried on right and left hand wheels 42 and 44 and supporting between the wheels conditioning means illustrated here in dotted lines and designated by the numeral 46. A tongue 48 extends forwardly from the conditioner frame 40. The conditioning means 46 is driven by drive mechanism contained in a housing 50 and having a forwardly extending input shaft 52 which includes a slip clutch 54.

The drive mechanism that delivers to the housing 38 on the mower includes an input shaft 56 having a slip clutch 58. As has been indicated above, and as will be brought out in greater detail below, the improved drive mechanism enables the use of the independent slip clutches 54 and 58 in parallel rather than in series.

The improved hitch comprises a fore-and-aft hitch frame 60 having means 62 at its front end for articulate connection to a portion of the mower frame M to the left of the fore-and-aft centerline of the tractor. The connection 62 includes a pivot at 64 on a transverse axis for affording articulation in the connection. The hitch frame 60 extends rearwardly from the connection 62 to a rear end at which it is wheel-supported by a caster wheel 66. The rear end of the hitch frame 60 has a rearward extension 68 which affords draft means for connection to the front end of the tongue 48 of the conditioner. As best shown in Fig. 1, the extension 68 terminates as a hitch bar 70, apertured at 71 to receive a hitch pin (not shown). A further part of the hitch includes link means 72 having a rear connection 74 to the hitch frame 60 and a front connection 76 to a portion of the mower frame 26 that is offset to the right side of the longitudinal centerline of the tractor. Hence, the link means 72 is oblique relative to the hitch frame 60. The front connection 76 includes a clevis having a pivot pin 80 for articulation about an axis oblique to the line of travel. The rear connection at 74 is shown here as including an elbow 82 welded at 84 to the extension 68 and having a pivot pin connection 86 to the rear end of the link means 72 to afford an axis for articulation, this axis being generally parallel to the axis at 80. As will be obvious, the three axes 64, 80 and 86 are generally triangularly related.

Since the caster wheel 66 supports the hitch frame 60 at a level above that of the forward end of the tongue 48 of the conditioner, the extension 68 is directed downwardly and rearwardly over the caster wheel to afford the clevis connection or hitch bar at the level of the tongue. From the description thus far, it will be seen that the hitch frame connects the conditioner in series with the mower M and in the offset relationship previously described, the interconnections among the several components of the vehicular train being articulate so that each component is free to follow varying ground contour. The caster wheel 66 facilitates proper trailing of the conditioner on corners and turns.

Another feature of the invention is the improved drive coupling means denoted in its entirety by the numeral 88 and best shown in detail in Figs. 2 and 3. In brief, the purpose of the coupling means 88 is to enable connection of the power take-off shaft 18 of the tractor to the driving mechanisms for the mower and conditioner, which is preferable to connecting the conditioner shaft in series with the mower input shaft 56 as by a connection directly to the mechanism in the mower drive housing 38, for example.

The coupling unit comprises a support made up of a pair of parallel spaced apart members or plates 90 which are rigidly cross-connected at opposite ends by supporting angles 92 and 94 which afford means for affixing the support 90—90 removably to the tractor. As shown in Fig. 1, the upper angle 92 is connected by means of cap screws 96 to a bracket 98 which is in turn bolted at 100 to the left hand axle housing 22. It is of course considered that the axle housing 22 is a part of the tractor body and, broadly, so is the draft structure 24 to which the lower bracket 94 is connected as by a bolt 102. The support is therefore readily connectible to or disconnectible from its mounted position on the tractor.

The spaced plates journal therebetween first and second shafts 104 and 106. The shaft 104 is a lower shaft and is axially hollow or has an axially hollow portion 108 internally splined to coaxially receive the splines on the tractor power take-off 18. The tubular or hollow shaft 104 is journaled in the support plates 90 by spaced bearings 110 and the end opposite to the internally splined portion 108 has rigid thereon a universal joint yoke 112 which affords connecting means for connection to a universal joint yoke 114 at the front end of the mower input shaft 56. Hence, the shaft 104 has opposite end portions projecting from the support, one being connectible to the tractor power take-off and the other being connectible to the mower input shaft or any equivalent drivable mechanism of an implement.

The second or upper shaft 106 is likewise appropriately journaled in bearings 116 in the support plates 90 and has a splined rear end portion 118 projecting rearwardly or in the same direction as the universal joint yoke 112 on the shaft 104. The splines on the shaft extension or portion 118, together with a connection pin 119, afford means for connecting the shaft 118 to the front end of a propeller shaft or power shafting 120 for the conditioner C. The front end connection of the shaft 120 to the shaft 118 is preferably effected by coupling means including a universal joint 122. The shafting 120, like the mower input shaft 56, is preferably of a telescopic nature to accommodate changes in length in the shafting as the vehicular components encounter varying ground contour. The hitch frame 60 carries at its rear end an upstanding support or bracket 124 having a bearing 126 in which the rear end of the shaft 120 is journaled. The bracket 124 is appropriately braced at 128 and the rear portion of the shaft 120 is splined at 130 for connection by means of intermediate shafts 132 and 134 to the input shaft 52 of the conditioner drive mechanism in the housing 50. The two shafts 132 and 134 are preferably interconnected by a universal joint 136, and a universal joint 138 is used between the front end of the shaft 132 and the splined rear end 130 of the power shafting 120.

The intermediate or jackshafts 104 and 106 in the support 88 respectively carry sprockets 140 and 142 and these sprockets are interconnected by a drive chain 146, the whole affording drive means between the two shafts 104 and 106. The sprocket 142 is keyed at 148 to the shaft 106 and a key 150 fixes the sprocket 140 to the other shaft 104.

Because of the removable mounting connections at 96 and 102, and further because of the splined connection at 108, the coupling unit 88 may be readily mounted on and dismounted from the tractor, according to whether the tractor is used with one or more implements or an implement having a plurality of drivable parts. Of course, the drive ratio between the shafts 104 and 106 could be changed so that one of the shafts is driven at a speed different from that of the other.

Likewise, the hitch comprising the hitch frame 60 and link means 72 can be readily disconnected from the mower frame at the points 64 and 80. The over-all arrangement is such as to greatly facilitate the use of a conditioner or similar implement with a mower, particularly a mower of the trail-behind type, it being understood that in side-mounted mowers in which the cutting mechanism is mounted ahead of the tractor rear wheels and projects laterally from one side thereof the conditioner may be connected directly to the rear of the tractor.

Features of the invention not categorically enumerated will undoubtedly occur to those versed in the art, as will modifications and variations in the preferred structure illustrated, all of which can be achieved without departure from the spirit and scope of the invention.

What is claimed is:

1. A hitch for use in a tractor-mower-crop conditioner train in which the mower has a frame articulately and trailingly connected to the tractor, cutting means extending laterally from the frame to cut a swath to the right of the tractor and a wheel supporting the frame rearwardly of the cutting means and laterally intermediate the cutting means and the fore-and-aft centerline of the tractor, the tractor has a rearwardly projecting power shaft for driving the mower and conditioner, and the conditioner is wheel-supported in trailing relation to the tractor and rearwardly of the mower to pick up, condition and return to the field a previously cut swath to the left of the aforesaid swath cut by the cutting means and said conditioner has a forwardly extending tongue generally on the fore-and-aft centerline of the tractor, said hitch comprising: a fore-and-aft hitch frame having means at its front end adapted for support on and articulate connection to a portion of the mower frame to the left of the tractor centerline and extending rearwardly therefrom to a rear end proximate to the conditioner tongue; wheel means rearwardly of and to the left of the mower wheel and supporting the rear end of the hitch frame; draft means on said rear end adapted for connection to the conditioner tongue; link means articulately connected at its rear end to the hitch frame adjacent to the rear end of the latter and extending forwardly and rightwardly in oblique relation to said hitch frame and having means at its forward end adapted for articulate connection to a portion of the mower frame to the right of the tractor centerline; and fore-and-aft power shafting supported in part by the hitch frame and having front and rear coupling means adapted for connection respectively to the aforesaid power shaft and to the conditioner.

2. The invention defined in claim 1, in which: the wheel means for the hitch frame is a caster wheel supporting said hitch frame at a level above that of the conditioner tongue; and the draft means extends rearwardly and downwardly over the caster wheel to the level of said tongue.

3. The invention defined in claim 1, in which: the front coupling means for the power shafting includes first and second drivingly interconnected intermediate shafts, said first intermediate shaft being connected to the power shafting and said second intermediate shaft having opposite front and rear ends for connection respectively to the tractor power shaft and to the mower cutting mechanism.

References Cited in the file of this patent

UNITED STATES PATENTS

| | | |
|---|---|---|
| 2,004,213 | Paul | June 11, 1935 |
| 2,150,350 | Vargas | Mar. 14, 1939 |
| 2,592,269 | Getz | Apr. 8, 1952 |
| 2,603,050 | Scheer | July 15, 1952 |
| 2,618,980 | Cook et al. | Nov. 25, 1952 |
| 2,711,622 | Cunningham | June 28, 1955 |